United States Patent
Koeppe (12)

(10) Patent No.: US 6,377,858 B1
(45) Date of Patent: Apr. 23, 2002

(54) SYSTEM AND METHOD FOR RECORDING AND CONTROLLING ON/OFF EVENTS OF DEVICES OF A DWELLING

(75) Inventor: Eugene C. Koeppe, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/942,472

(22) Filed: Oct. 2, 1997

(51) Int. Cl.[7] ............................................. G05B 11/01
(52) U.S. Cl. .............................. 700/12; 700/14; 700/16
(58) Field of Search ............................. 700/12, 14, 16, 700/23, 86, 22, 286, 295, 296

(56) References Cited

U.S. PATENT DOCUMENTS

| 4,213,182 A | * | 7/1980 | Eichelberger et al. | 700/296 |
| 4,279,012 A | * | 7/1981 | Beckedorff et al. | 700/16 |
| 4,567,557 A | * | 1/1986 | Burns | 700/16 |
| 4,735,219 A | * | 4/1988 | Seeland | 134/18 |
| 5,086,385 A | * | 2/1992 | Launey et al. | 700/83 |
| 5,233,510 A | * | 8/1993 | Brueckner et al. | 700/2 |

* cited by examiner

*Primary Examiner*—Paul P. Gordon

(57) ABSTRACT

A system and method that simulates actual use of appliances and devices in a building learns actual usage patterns over an extended length of time. By replaying such learned sequences to controlled devices whereby the devices are turned on at off, the on/off sequences appear more natural making a building or dwelling appear to be occupied. The realistic control of devices mimics occupancy of a dwelling. In a learn mode, an intelligent control system records and stores the on/off events of controlled devices in the dwelling. In a run mode, the intelligent control system replays the on/off events thus reflecting the usage patterns of the resident.

25 Claims, 16 Drawing Sheets

SYSTEM AND METHOD FOR RECORDING AND CONTROLLING ON/OFF EVENTS OF DEVICES OF A DWELLING

BACKGROUND OF THE INVENTION

1. Field of the Invention

The present invention relates generally to security systems. In particular, the present invention relates to an intelligent control system for simulating occupancy of a building or dwelling.

2. Description of the Related Art

Deterring vandalism and burglary are important for property owners. Vandalism and property theft can often be deterred merely by having the premises occupied or watched by security personnel. Making a building appear to be occupied is also an effective deterrent to burglary, vandalism and other trespass. When away from home, many residents use lighting control systems such as timers and/or carrier control units, to turn lights on and off so as to simulate occupancy of a building.

The well-known electromechanical lamp timer, plugged into an outlet with a controlled device plugged into the timer, can turn a lamp, television, radio, or other device on and off at designated times. While the controlled device, e.g., a lamp or radio, does come on and go off at a set time, lamp timers offer marginal security because a determined thief can, and will, watch a home or building and quickly learn that lights and/or other appliances predictably go on and turn off at precisely the same time. In fact, appliances that cycle on and off at precisely the same time, every day, actually suggest that the building is unoccupied. Repeated on/off occurrences at the same time each day indicate that a house or building is unoccupied and might make the house a target for a burglar. A home, office or other building might be actually more susceptible to invasion by a burglar after a prior art timer's schedule has been learned.

Prior art radio frequency (RF) carrier control units also exist which extend the function of the simple timer. In a carrier control security system, control signals to turn appliances on and off are modulated onto RF signals carried on existing AC building wiring. These on/off control signals are detected by lamp or appliance control modules equipped with radio frequency receivers which detect the on/off control signals and apply or remove AC power to a device plugged into the remote control unit. On and off times are set by the carrier control system controller.

In a carrier control unit, house codes and device codes are first established for the carrier control unit and controlled switches associated with each controlled device. On/off commands for a controlled device can be initiated at the control unit by the user or a sequence of on/off events at given times and may be programmed by the user. The programmed on/off events typically repeat each day but can be repeated at some other period. The carrier control unit will turn on the designated devices at the time of day established by the resident. A problem with these prior art carrier control devices however is that the static nature of the program can still be learned simply by watching the building or residence for a few days. While some carrier control devices can vary on-off cycle times, by a few minutes, the patterned behavior of controlled devices is not difficult to determine. Further, if a building occupant or resident wants on/off times significantly varied, the system must be manually reset or reprogrammed.

Prior art security systems, which rely on preprogrammed controllers or timers, do not accurately simulate occupancy of a building. Consequently, there exists a need for a method and apparatus that more accurately simulates occupancy of a building or dwelling by providing realistic control of lighting equipment and appliances. Accordingly, an object of the present invention is to provide an intelligent control system capable of more accurately simulating building occupancy.

SUMMARY OF THE INVENTION

The present invention is a method and apparatus for an intelligent control system that records the actual on/off events of devices controlled by the system over a daily, weekly, or other user-specified time period. In simulating occupancy of a residence or other building, the intelligent control system replays recorded on/off events of the controlled devices thereby reflecting actual usage patterns of controlled appliances by the resident or building occupant. By learning and then replaying actual use of controlled appliances, the system can actually replicate building conditions that indicate building occupancy.

The system operates in two modes. In a "learn" mode, the system controller, monitors and detects actual use of controlled appliances for a user-defined length of time and records on/off cycles of the controlled devices. These controlled appliances could include lighting equipment, audio equipment, heating and/or air conditioning equipment, or other electrically powered appliances the use and/or operation of which would indicate that the residence or building is occupied.

In a "run" mode, the system controller plays back the on/off cycles of controlled appliances whereby the appliances are actuated by the controller as if the occupant were using them. After learning appliance use, the system can actually replicate their use thereby making a residence or other building appear to be occupied.

By learning and storing actual usage patterns of appliances over a period of time, the method and apparatus disclosed herein can render a more lifelike simulation of building occupancy. Occupied buildings, as well as buildings that appear to be occupied, are less likely to be vandalized or burglarized.

In one embodiment, the intelligent control system records on/off events for a single device. In another embodiment, an intelligent control system controls multiple devices, simulating occupancy of a user's residence or building.

BRIEF DESCRIPTION OF THE DRAWINGS

In the following detailed description of the preferred and alternative embodiments, reference will be made to the accompanying drawings wherein.

DETAILED DESCRIPTION OF THE PREFERRED EMBODIMENT

Figure 1:
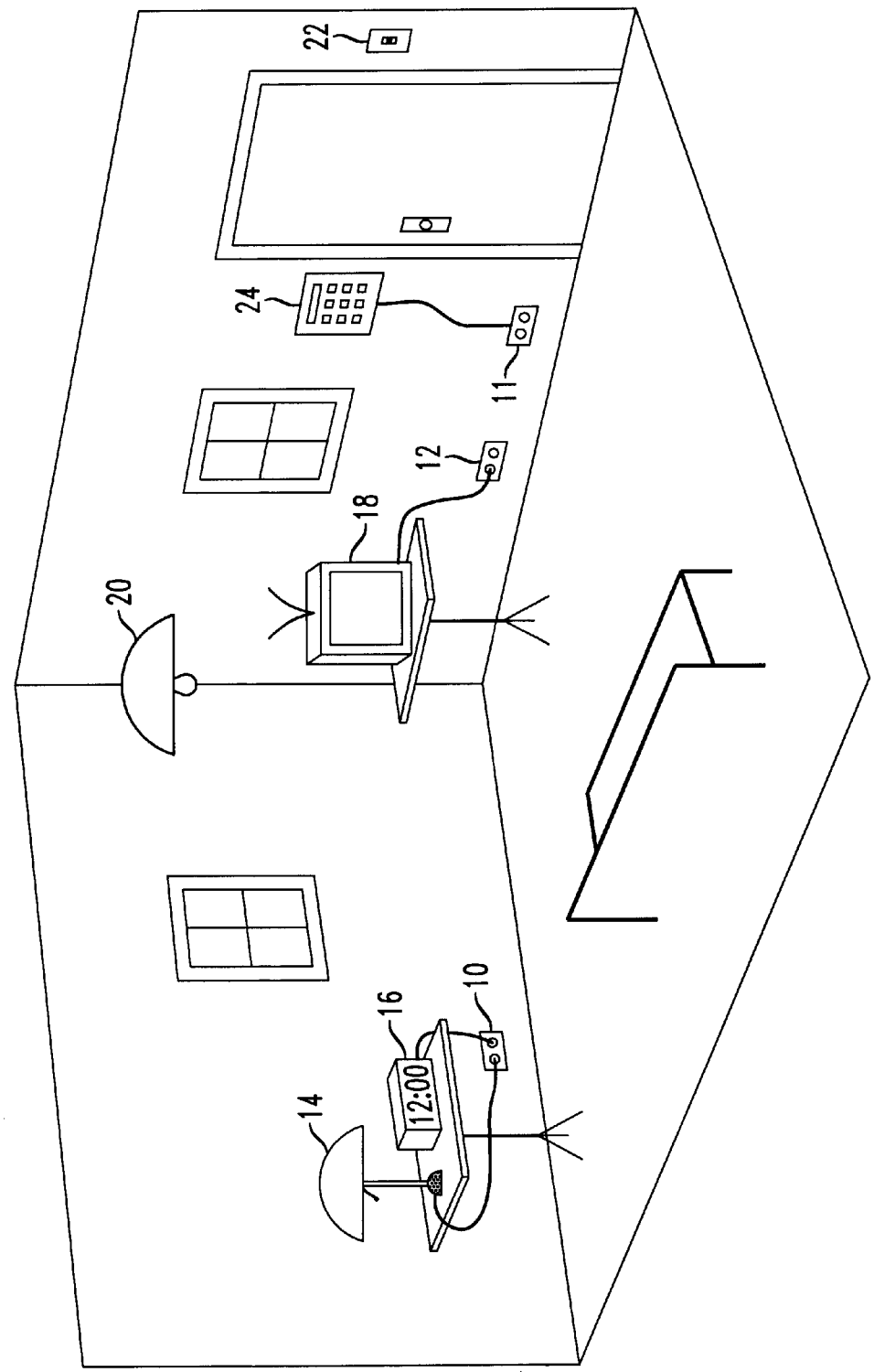
FIG. 1 shows an illustration of a room in a dwelling with numerous devices controlled by a prior art carrier control system.

FIG. 1 shows an illustration of a room in a dwelling with devices controlled by a prior art timing device, commonly known as a lamp timer 26. Electrical power for appliances that include television receiver, lighting equipment and the like, is available through a number of electrical outlets 10, 11 and 12. In FIG. 1, a lamp 14 and a clock 16 are shown plugged into an outlet 10. Additionally, a television receiver 18 is connected into an outlet 12. Devices might also be directly connected to the building wiring, such as an overhead lamp 20 wired directly to the building's electrical wiring and controlled by a wall switch 22. As set forth above, the lamp timer's static control cycle and its predictability provide a poor simulation of occupancy.

The timer 26 is typically controlled by a circular control knob 30. An alternative prior art timer (not shown) has a key pad and a digital clock. The control knob 30 of the timer 26 functions like a clock, rotating as time passes. Keys or pins attached to the control knob 30 open or close switch contacts in the timer (not shown) to supply or cut off electrical power to an appliance plugged into the timer 26. A user can set the control knob 30 to a specific time to turn on and turn off a controlled device, such as a lamp 25. Timers 26 usually provide for a manual control switch 32 so that a user can override the setting established on the timer 26 and manually turn on or off a controlled device 25. Most lamp timers 26 can control only one device. In a building security system, one timer 26 would be required per controlled device. Each timer would need to be set for the on/off times of the device.

Controlled on/off cycles for the devices shown in FIG. 1 (14, 16, 18 and 20) can also be accomplished by using a well known carrier control system 24. Devices such as the television 18 and overhead lamp 20 are controlled by the carrier control system 24 through a controlled outlet 12 or controlled switch 22, or an add on device (not shown) interposed between lamp 14 and outlet 10. Radio frequency signals carried over existing building power lines are used to control the on and off cycles of the controlled devices and transmitters and receivers at various points on the power line for signaling the controlled devices.

As set forth above, prior art lamp timers and programmable carrier control system do not faithfully simulate occupancy of a building or a dwelling because the programming is static. Fixed, preprogrammed on/off cycles are quickly learned by observation; once learned they suggest building vacancy and an optimum time to enter the building.

Figure 2:
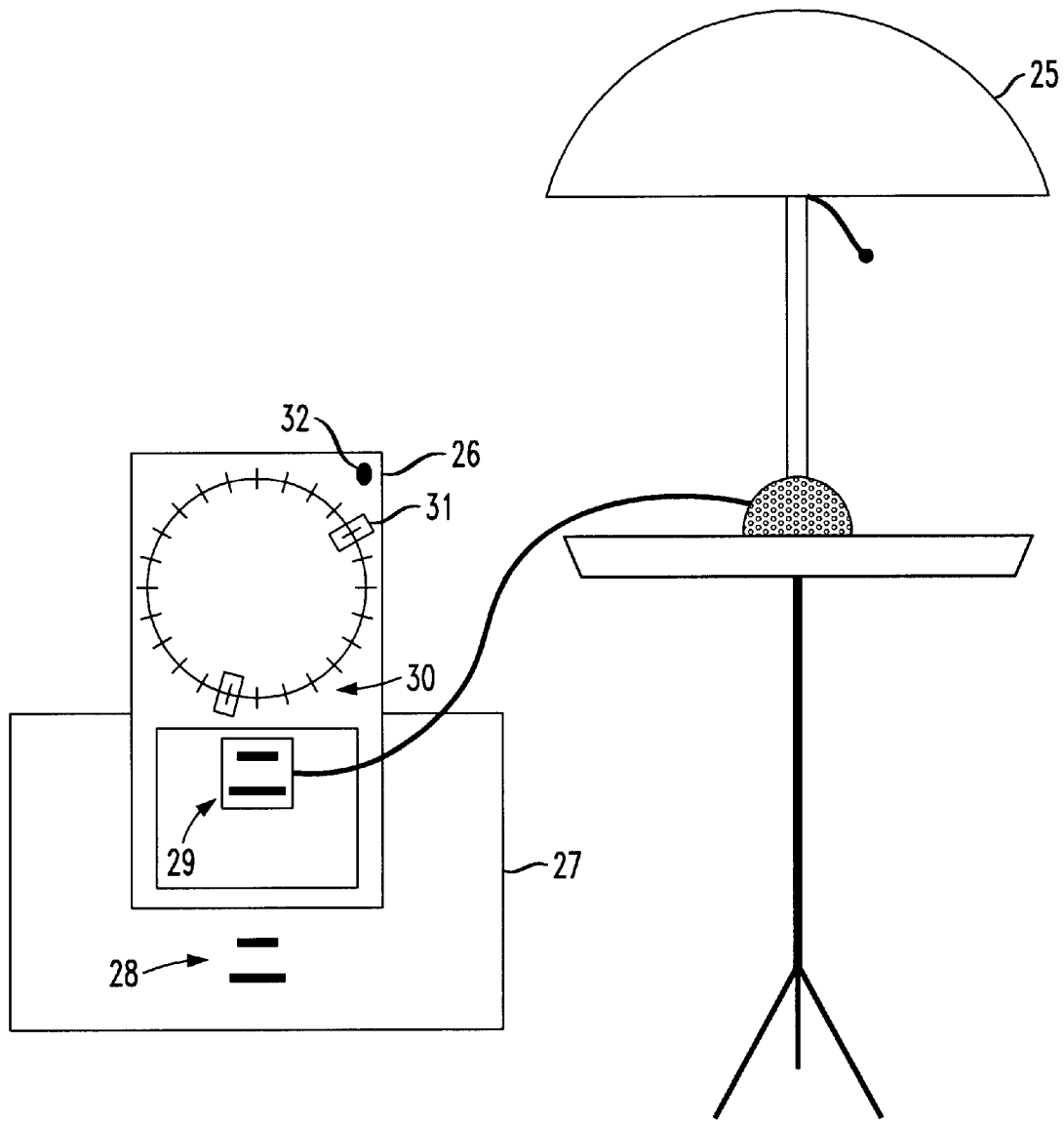
FIG. 2 shows an alternative prior art arrangement for controlling turning on and off a device using a timing device.
Figure 3:
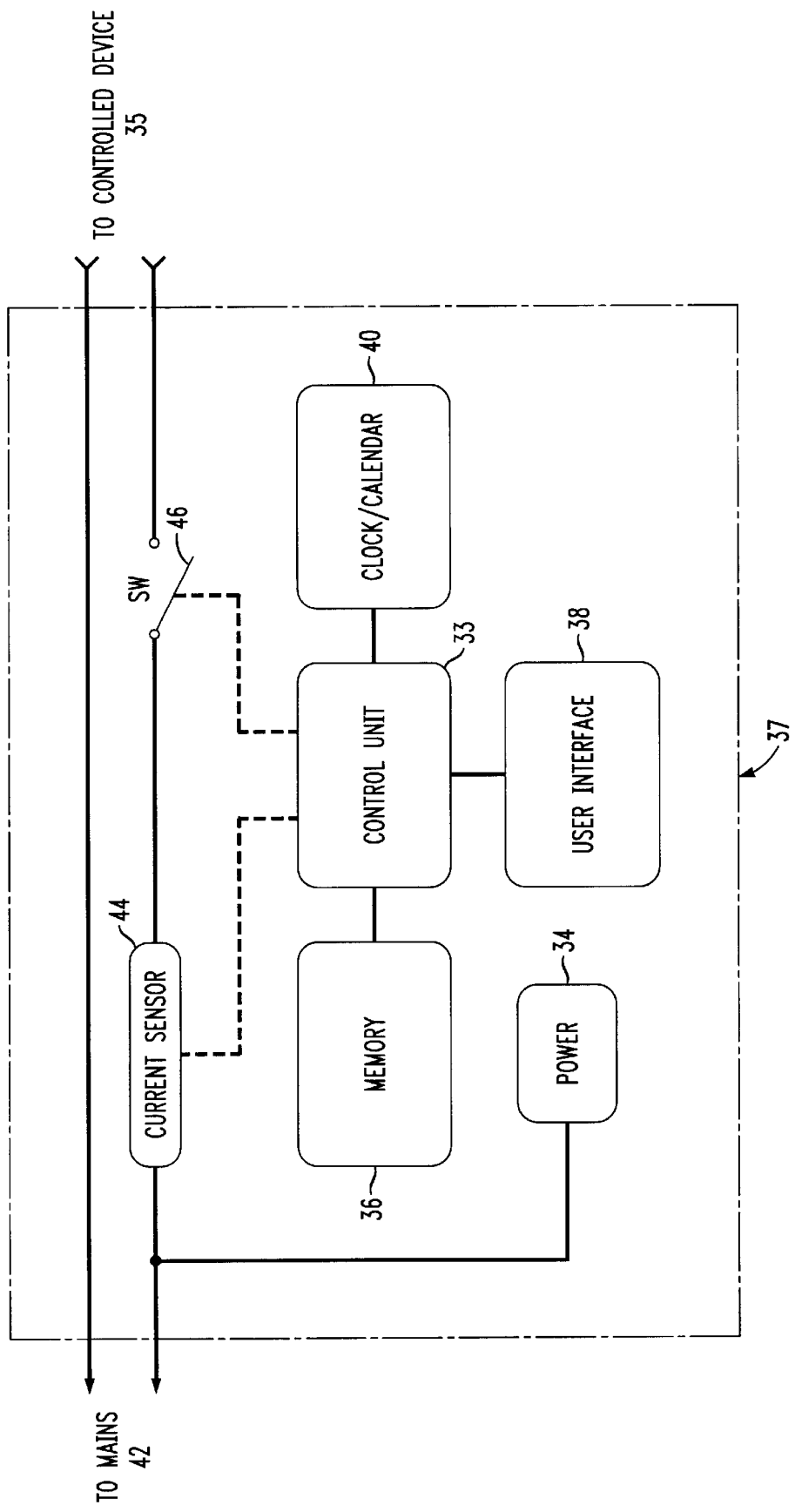
FIG. 3 shows a block diagram of an intelligent control system used to control a device.

FIG. 3 shows an intelligent control system 37 of the present invention. The embodiment shown in FIG. 3 is a single-unit controller that serves as a replacement for the prior art lamp timer shown in FIG. 2. Input power 42 to the control system 37 is switched to a load or controlled device 35 to effectively control a single device coupled to the control system 37. Appliance devices, such as lighting equipment, audio equipment, or other electrically powered equipment can be turned on and off automatically by the intelligent control system 37 as if a building or dwelling were occupied.

The intelligent control system 37 includes a control unit 33, power source 34, memory 36, user interface 38, clock and calendar unit 40, current sensor 44 and a switch 46. The control unit 33 in combination with the other components, includes the ability to learn actual usage patterns of controlled devices. The system can actually replicate appliance use by the building's occupants thereby making a building's vacancy considerably more difficult to identify.

In a learn mode, actuation times of controlled devices are detected and stored in memory. In run mode, these actuation times can be replayed by the system so as to faithfully recreate actual appliance usage thereby making the building appear to be occupied. The system can be designed to extend the simulation period, i.e., the period of time over which the system learns and re-enacts occupancy for as long as a user might want.

In the learn mode, a controlled device interface 48 receives all event commands, such as turn on, turn off or dim, sent to each device. These commands are stored in memory 36 associated with the day-of-week, time-of-day and information of the identity of each device. In the run mode, the intelligent control system 47 replay event commands using the information stored in memory 36 on the device, such as time-of-day and day-of-week so as to faithfully reproduce appliance use thereby making a dwelling or residence appear to be occupied.

Operation of the system depicted in FIG. 3 is illustrated by way of example. An event to be learned is an on or off transition of the controlled device 35. When a switch controlling a device (not shown), is closed, current sensor 44 detects current flow when the controlled device 35 is turned on or off via the switch controlling the device. In addition to detecting the absence or presence of current flow to a switched device, current sensor 44 preferably detects current magnitude changes as well. Current magnitude changes can be considered to be on/off events. A switch activation signal to the control unit 33, which could include any suitable microprocessor or equivalent device, causes the control unit 33 to record the event in a memory 36. While in the learn mode, subsequent activation and deactivation of the monitored device 35 by turning the power 34 to the controlled device 35 on or off can be stored in memory 36 so as to faithfully record use of the controlled device 35 over a considerable length of time. Activation and deactivation of the controlled device 35 in the system's "run" mode, as set forth below, is accomplished by simply changing the state of switch 46.

Day-of-week and time-of-day information from a clock and calendar unit 40, and the event type (i.e. on or off) is stored is memory 36 for each on/off event by the control unit 33 in the intelligent control system 37. Depending upon the size of the memory 36, the control unit 33 can store multiple records for each day. Moreover, the intelligent control system 37 can be programmed to randomly insert offset times to change the learned on/off times of controlled devices.

In the run mode, a control unit 33 of the intelligent control system 37 uses time-of-day and day-of-week information from the clock and calendar unit 40 and event record data previously stored in memory 36 to take over actuation of controlled devices. Actuation events previously recorded in the learn mode during which the control unit 33 sensed closure of the switch 46 and used the current sensor 44 information to identify on and off events of the controlled device 35, are replayed at the appropriate times, established by the clock and calendar unit 40, so as to simulate actual occupation of the building.

Although the term switch is used here, any circuit interrupting device, such as a relay or triac for example, and which makes or breaks a circuit, and which is capable of being controlled by the control unit 33 may be used as a switch. In this embodiment, one intelligent control system 37 is required per controlled device 35 (not shown in FIG. 3). A controlled device 35 could include, but would not be limited to lights, audio equipment, and appliances. The intelligent control system 37 shown in FIG. 3 is interposed between a device being controlled 35 such as a lamp, and a power source 34 such as the power provided by the main wiring for the dwelling.

The memory 36 which could be a well-known RAM, EEPROM or other equivalent which stores data on each device, including on/off events and times for each device. The clock and calendar unit 40 is a timer and provides the time of day and day of week functionality for the intelligent control system 37. The information from the clock and calendar unit 40 also provides timing information used by the intelligent control system 37 which includes on/off events and time and day of week information for each controlled device 35. A user interface 38 provides for a display device for a user. The user interface 38 displays the current status of the intelligent control system 37. Further, the user interface 38 has the capabilities of allowing a user to manually set the intelligent control system 37 to add events to memory 36 or override memory 36. For example, the intelligent control system 37 may have recorded an on event for a bedroom lamp at 5:00 a.m. on Monday. If the following Monday is a holiday, the user may choose to override this event and cause the intelligent control system 37 to turn the lamp on at 8:00 a.m. on the holiday. The lamp will come on as usual the next Monday at 5:00 a.m. unless the user intervenes.

Electrical current 42 for the dwelling is used by the intelligent control system 37. A battery back up, not shown, would prevent program loss and/or time of day, day of week settings and the need to reprogram these items into the controller in the event of a power failure. A switch 46 is used to control current flow to a controlled device 35. Any appropriate sensor that detects current flow could be used for the current sensor 44.

Figure 4A:
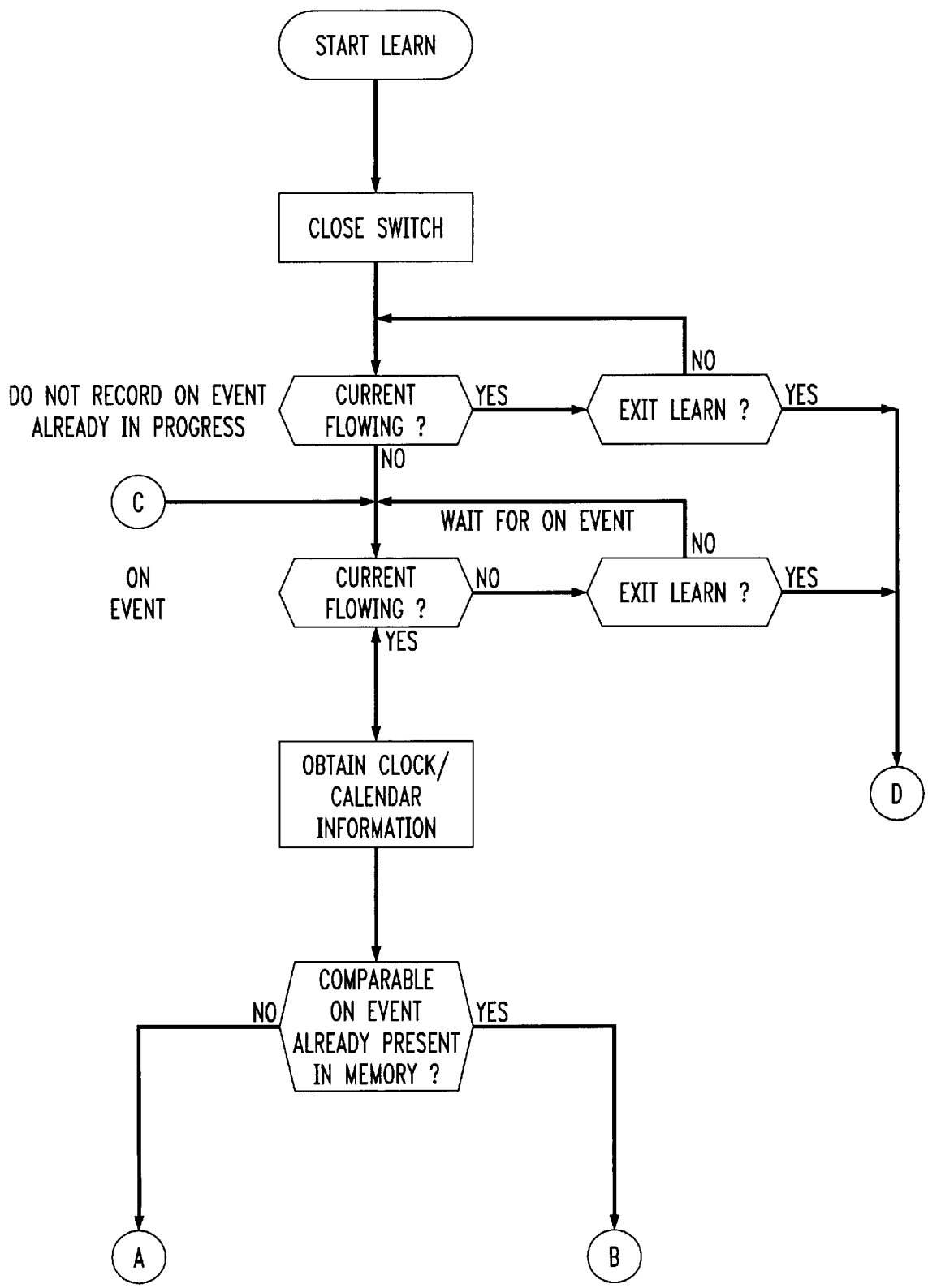
FIGS. 4A–4C show flow charts of the learn mode of the intelligent control system of FIG. 3.
Figure 4B:
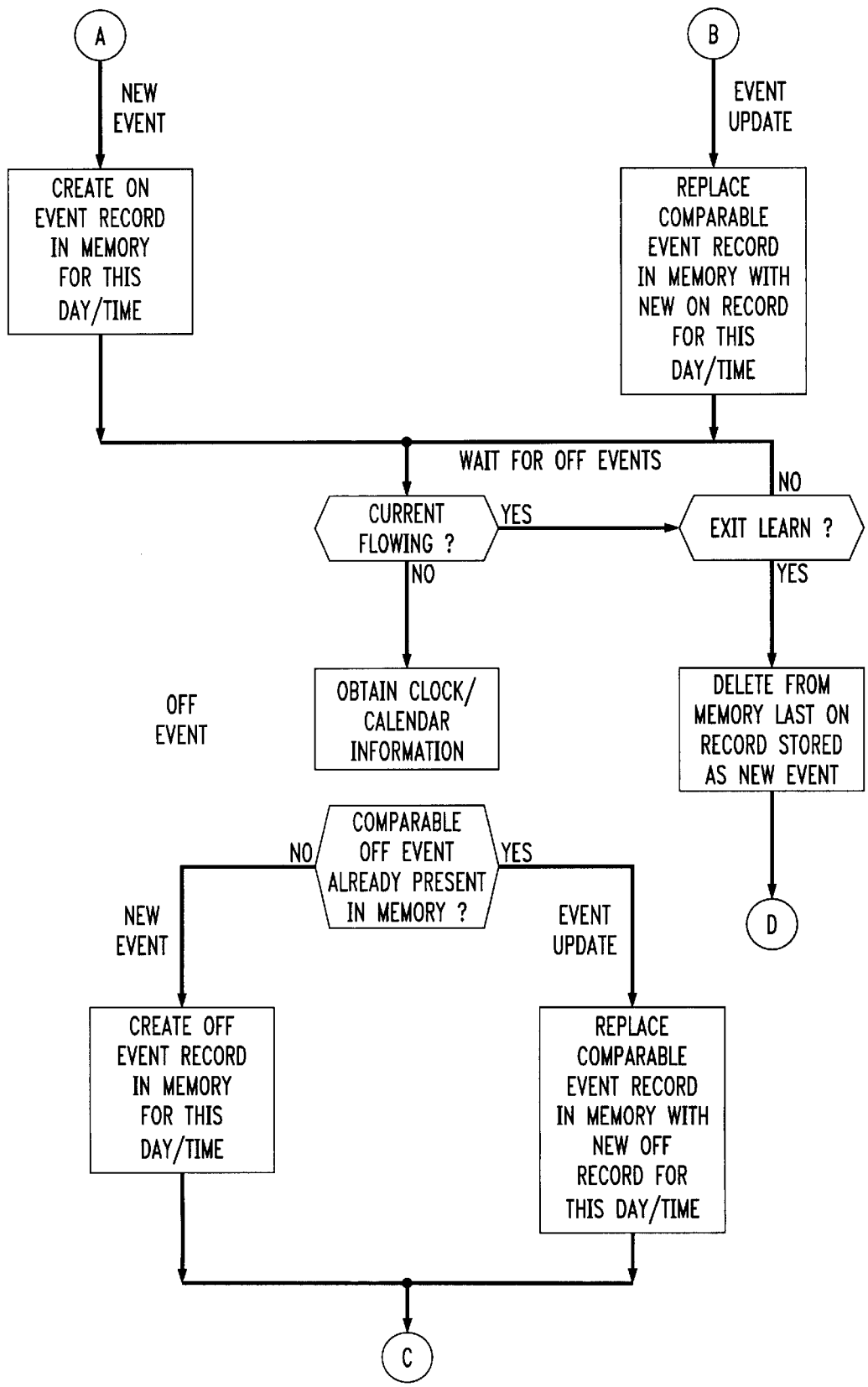
Figure 4C:
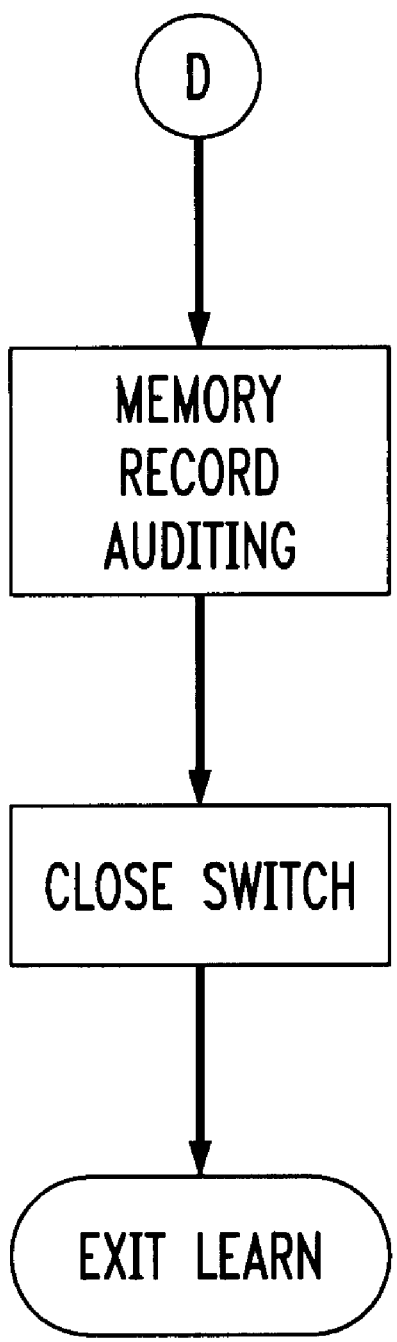

FIGS. 4A–4C depict operation of the learn mode of the preferred embodiment of the intelligent control system 37 of FIG. 3. Those skilled in the art will recognize that the sequence of operations performed by the system is preferably accomplished by a stored computer program although sequential logic circuitry might be used to control the system as well.

With respect to FIGS. 4A–4C, if current is flowing through switch 46 when the learn mode is entered, the system cannot accurately know the start time of the on event. Instead, the control unit 33 will wait until requested to exit the learn mode by the user via the user interface 38 or when the controlled device 35 is tuned off by a user and current stops flowing as detected by the current sensor 44. Thereafter, the next on event begins when the current sensor 44 detects current flow. The intelligent control unit 33 waits until requested to exit the learn mode by the user via the user interface 38 or when the controlled device 35 is turned on by the user and current starts flowing as detected by the current sensor 44.

When an on event occurs, timing information, which includes day of week and time of day, is read from the clock and calendar unit 40 by the control unit 33. After the time and day information is obtained from the clock and calendar unit 40, the memory 36 is read to determine if a comparable event record is already present in memory 36. If yes, an event update occurs and the comparable event record in memory 36 is replaced with a new on event record for the present day and time. If no, a new on event record is created in memory 36 for this day and time.

An off event is generally considered to be the interruption of or significant reduction of current to a controlled device. At the occurrence of an off event, the day and time information is read from the clock and calendar unit 40. If a comparable off record is present in memory 36 the comparable event record in memory 36 is replaced with a new off event record for the present day and time. If a comparable off event record does not already exist in memory, a new off event record for the present day and time is created.

Having recorded or updated the on event, the control unit 33 preferably waits until an off event occurs as determined by the current sensor 44 or until requested to exit the learn mode by the user via the user interface 38. An off event record must exist in memory 36 for each on event record in memory 36. Additional on/off event record pair for a particular controlled device must be chronologically non-overlapping. If the user requests exit from the learn mode while the controlled device 35 is on, the off event time and day cannot be determined. A new on event record added earlier will not have a corresponding off record since the off event has not yet occurred. In this case, the corresponding new on event record stored in memory 36 is deleted from memory 36. The memory 36 is audited to insure that on and off records are paired with each other and that the on off events do not overlap in time.

Figure 5A:
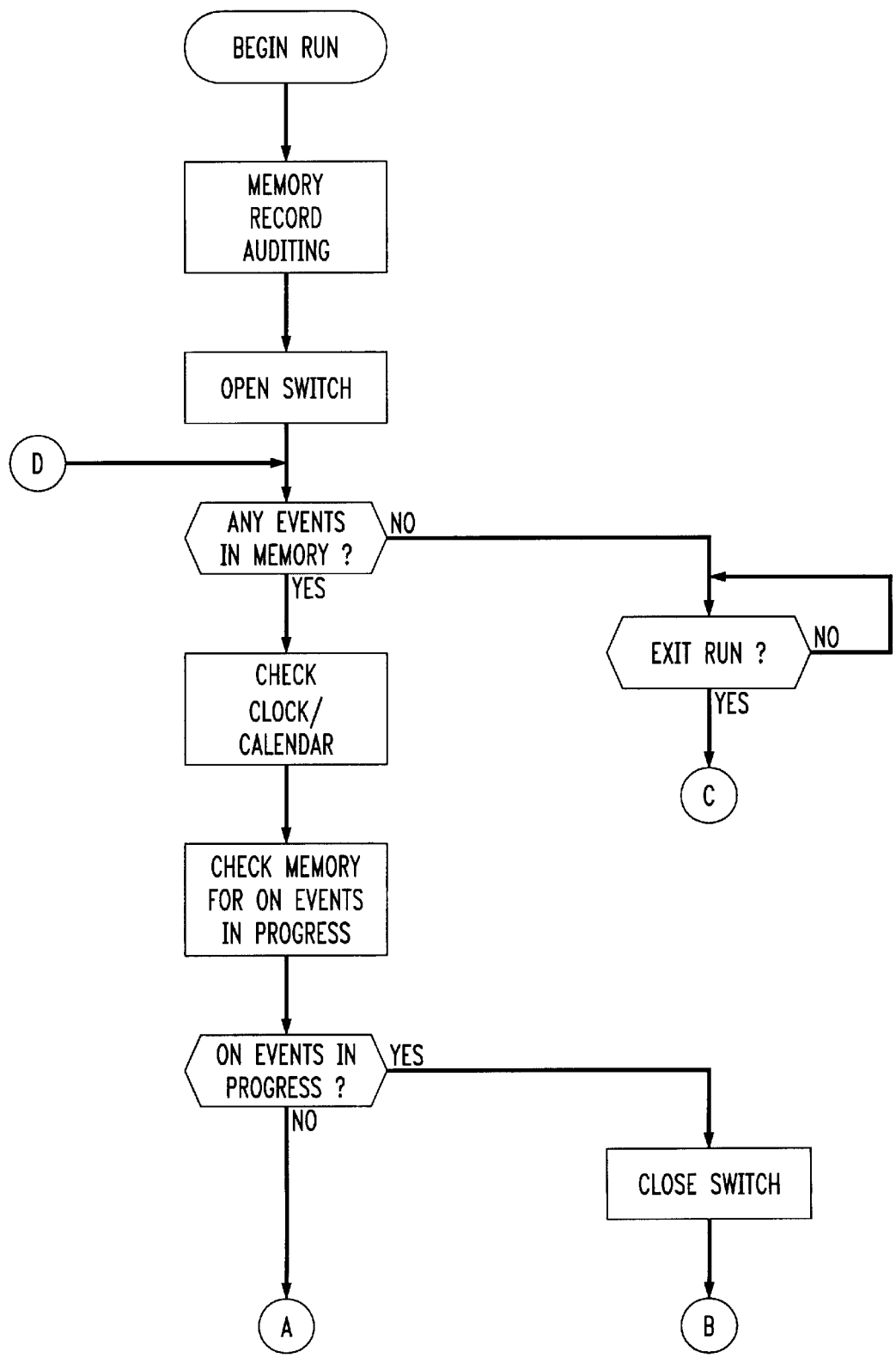
FIGS. 5A–5C show flow charts of the run mode of the intelligent control system of FIG. 3.
Figure 5B:
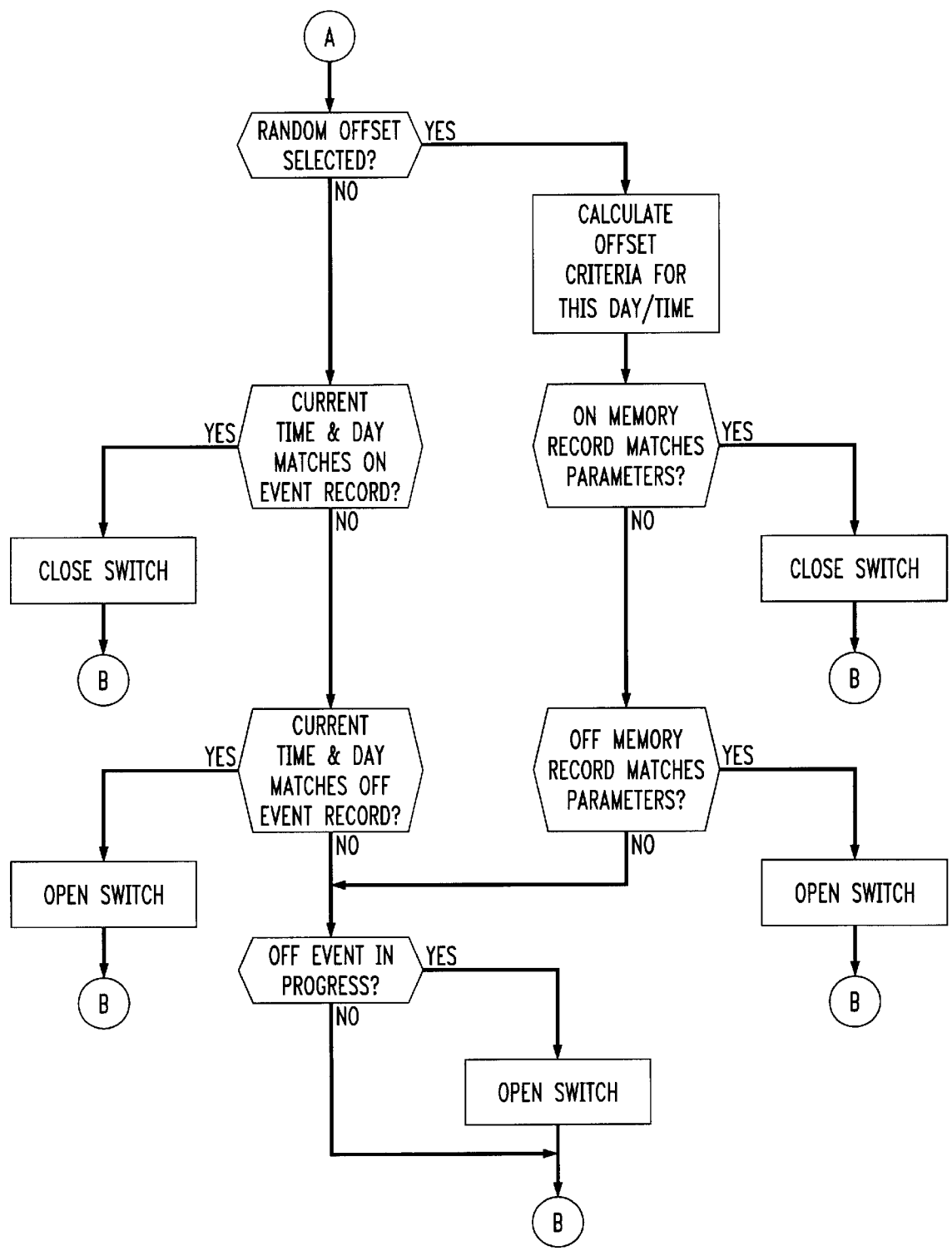
Figure 5C:
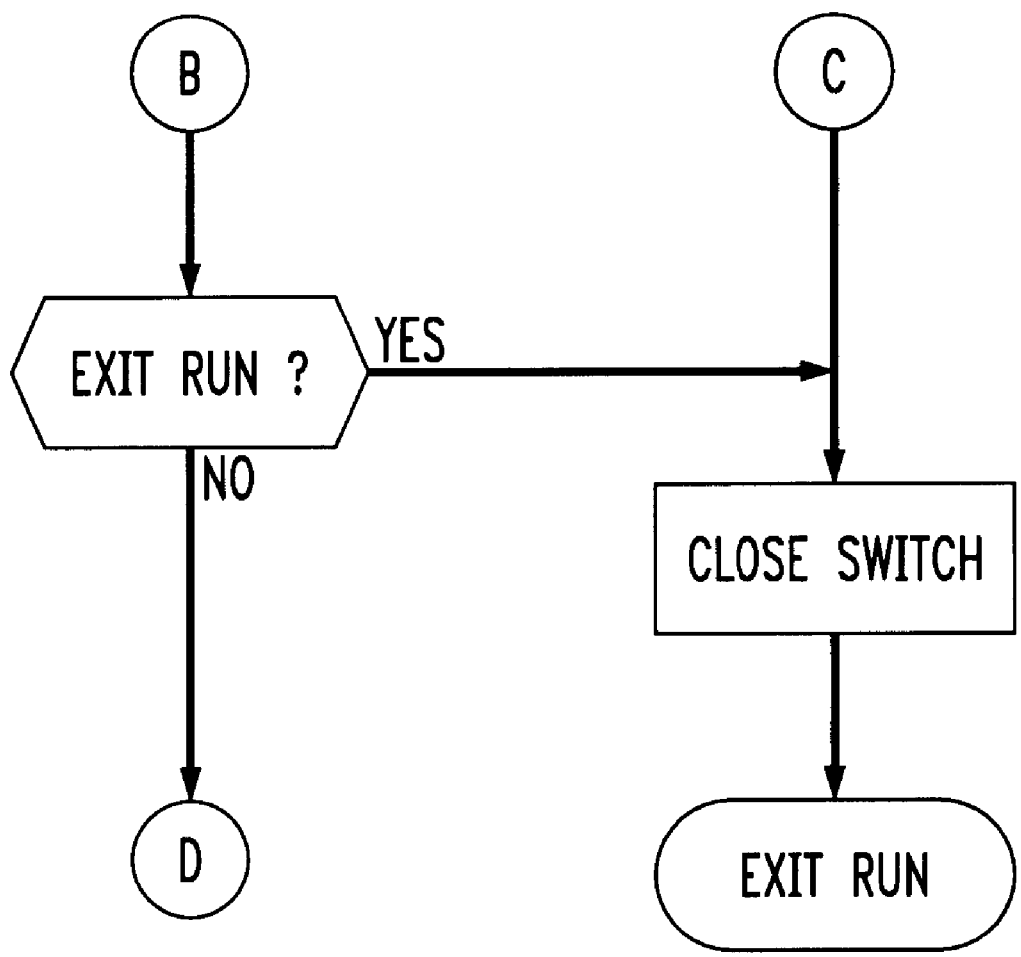

FIGS. 5A–5C show flow charts of the run mode of the intelligent control system 37 of FIG. 3. The user via the user interface 38 initiates the run mode. An auditing of the memory 36 occurs and then the switch 46 is opened. If no recorded events are in memory, the control unit 33 cannot execute and on/off simulation and waits until the user exits the run mode via the user interface 38. During this time, the control unit preferably indicates to the user that there are no events stored in memory 36 via the user interface 38 or by other means. If the user exits the run mode, then the switch 46 is closed and the run mode is exited.

If events are recorded in memory 36, a check of the clock and calendar unit 40 is performed to obtain current day and time information. The memory 36 is checked for on events that should be, or which are in progress. An on event is one for which the present day and time fall between the day and time of an on event and an off event record stored in memory 36. If on events are in progress, or should be in progress, the switch 46 is closed and a decision is made whether to exit the run mode. If the run mode is not exited, then the process returns to the step of checking for any on/off events in memory 36.

If on events are not in process, the system controller seeks to determine whether a random offset has been selected by the system's user. If yes, the random offset criteria for matching on and off events in memory 36 are calculated based on the present day and time. If the on event record in memory 36 matches the parameters for the on event record with the random offset the switch 46 is closed and the control unit 33 checks to see if the user is requesting an exit from the run mode. If an exit is not requested, the control unit 33 returns to its task of determining when the switch 46 should be opened and closed in response to event records in memory 36.

If the on event record in memory 36 does not match, a check is made to determine if the off event record in memory 36 matches the parameters set for a random offset. If the off record in memory matches the parameters set, then the switch 46 is opened and the run mode may be exited if requested by the user. If an exit is not selected event record processing continues. If the off record in memory 36 does not match the parameters set, a determination is made whether an off event is in process. If the off event is not in progress then the run mode may be exited if requested by the user. If an exit is not selected event record processing continues. If the off event is in progress then the switch is opened and then the run mode may be exited if requested by the user. If an exit is not selected event record processing continues.

If a random offset is not selected then a check is made to determine if the current time and day matches an on event record. If yes, then the switch 46 is closed and the run mode may be exited if requested by the user. If an exit is not selected event record processing continues. If no, then a determination is made whether the current time and day matches an off event. If yes, then the switch 46 is opened and the run mode may be exited if requested by the user. If an exit is not selected event record processing continues. If no, then a determination is made whether an off event is in progress. If yes, then the switch is opened and the run mode may be exited. If no, the run mode may be exited if requested by the user. If an exit is not selected event record processing continues.

A single controlled device can be plugged directly into an intelligent control system 37 shown in FIG. 3. Multiple devices can be remotely and automatically controlled using the alternate embodiment of the intelligent control system 47 shown in FIG. 6 which is capable of controlling multiple devices.

Figure 6:
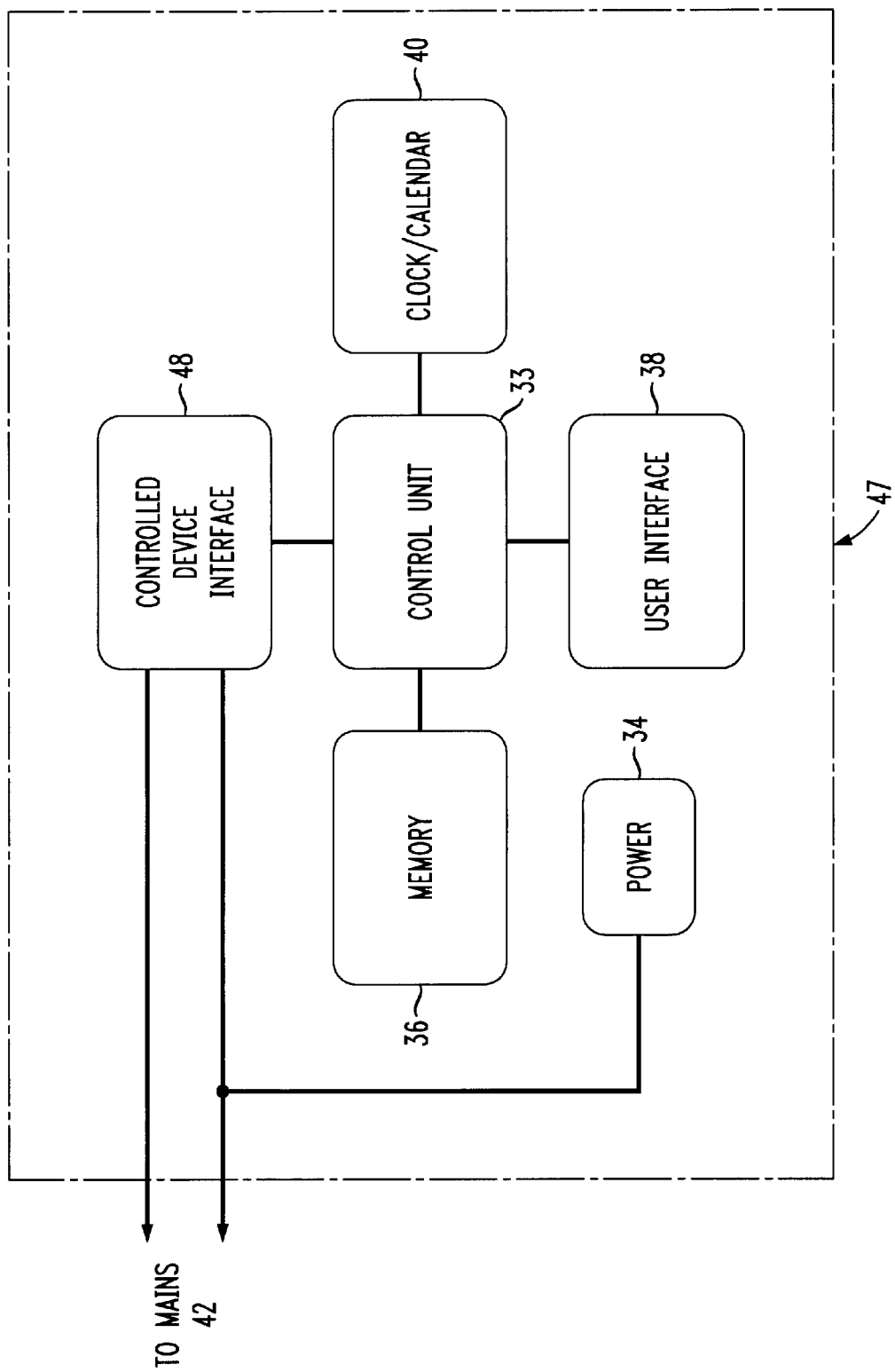
FIG. 6 shows a block diagram of an intelligent control system that interfaces with a prior art control system.

Referring to FIG. 6, an intelligent control system 47 that controls multiple devices is shown. In this embodiment, a controlled device interface 48 has been added to the system. The controlled device interface 48 includes a transmitter and receiver using signaling protocols and having electrical characteristics compatible with the controlled devices. The well-known X-10 carrier control system standard provides for controlling lights and appliances through the power line wires and could be used with the embodiment shown in FIG. 6. The X-10 standard uses the 60 HZ power as a carrier and modulates a 120 Khz signal to a digital pulse. Each device coupled to the system is identified using an addressing protocol also called a house code. Each device is controlled based on pulses sent to each controlled device. X-10, Tandy Corporation's Radio Shack and other private labels sell X-10 products that are compatible with the present invention.

In the alternate embodiment, the control device interface 48 is compatible with other existing device interfaces such as the X-10 carrier control systems that employ a house code in addition to a device code which minimizes interference between existing nearby systems. The house codes typically employ 8 to 16 devices on a house code. The controlled device interface 48 along with the intelligent control system 47 of the present invention provides for responding to and controlling more than one house code as desired. Thus, a user can use the present invention with existing systems without adding additional wiring.

The user interface 38 provides a means by which users can control events stored in memory 36. Among other things, the on and off event times can be varied by user-specified amounts through the user interface 38.

Figure 7A:
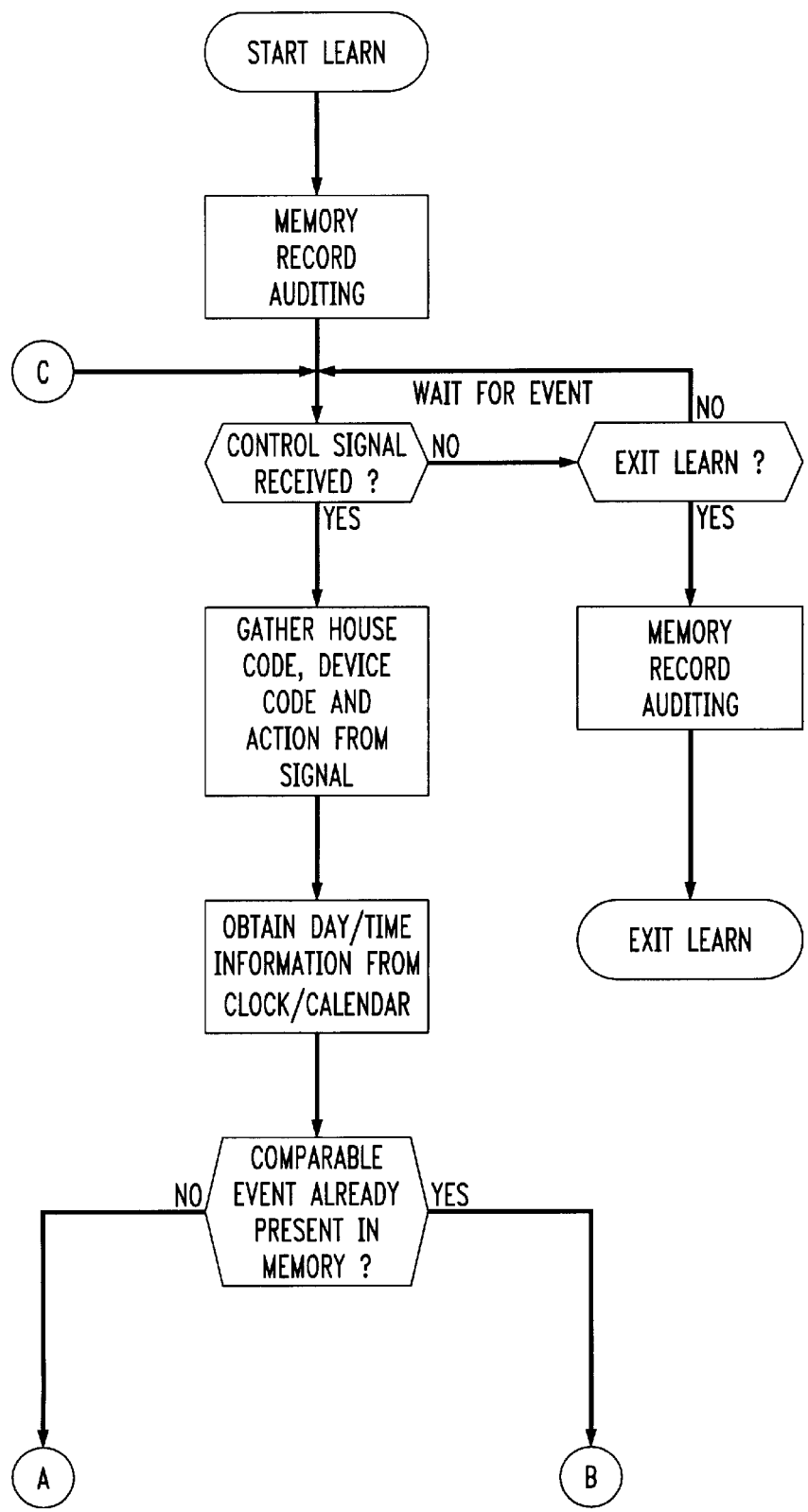
FIGS. 7A and 7B show flow charts of the learn mode of the intelligent control system of FIG. 6.
Figure 7B:
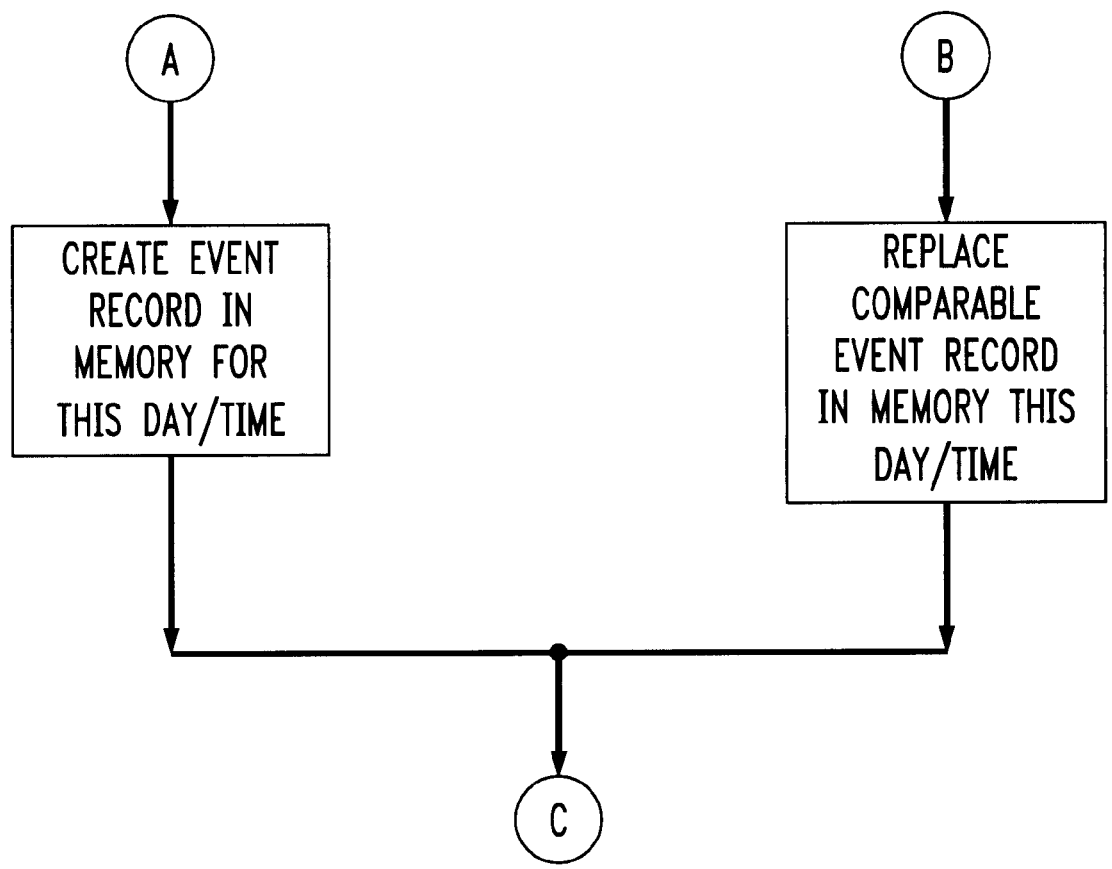

FIGS. 7A and 7B show flow charts of the learn mode of the intelligent control system 47 of FIG. 6. The learn process begins by a user interface 38 request whereupon a memory record audit is performed. If a control signal is received via controlled device interface 48 then the house and device codes and associated action is obtained from the received control signal. Information on time and day is read from the clock and calendar unit 40. A determination is made whether a comparable event is present in memory 36. If an event is stored within memory, the day and time information in the comparable event record is replaced with the present day and time. If no corresponding event is already stored, a new event record is created in memory 36 for the present day and time.

After writing the new event into memory, the control unit 33 waits for receipt of the next control signal via the controlled device interface 48, or a request from the user via the user interface 38 to leave the learn mode. If the learn mode is exited, the memory 36 record auditing is terminated and the learn mode is exited.

An off event record for each controlled device 35 must exist in memory 36 for each on event record in memory 36 for the controlled device 35. Additionally, on and off event record pairs must be chronologically non-overlapping. One of the functions of the memory audit is to reconcile memory records to this criterion. If the learn mode is not exited, the controlled device interface 48 waits for a control signal to be received.

Figure 8A:
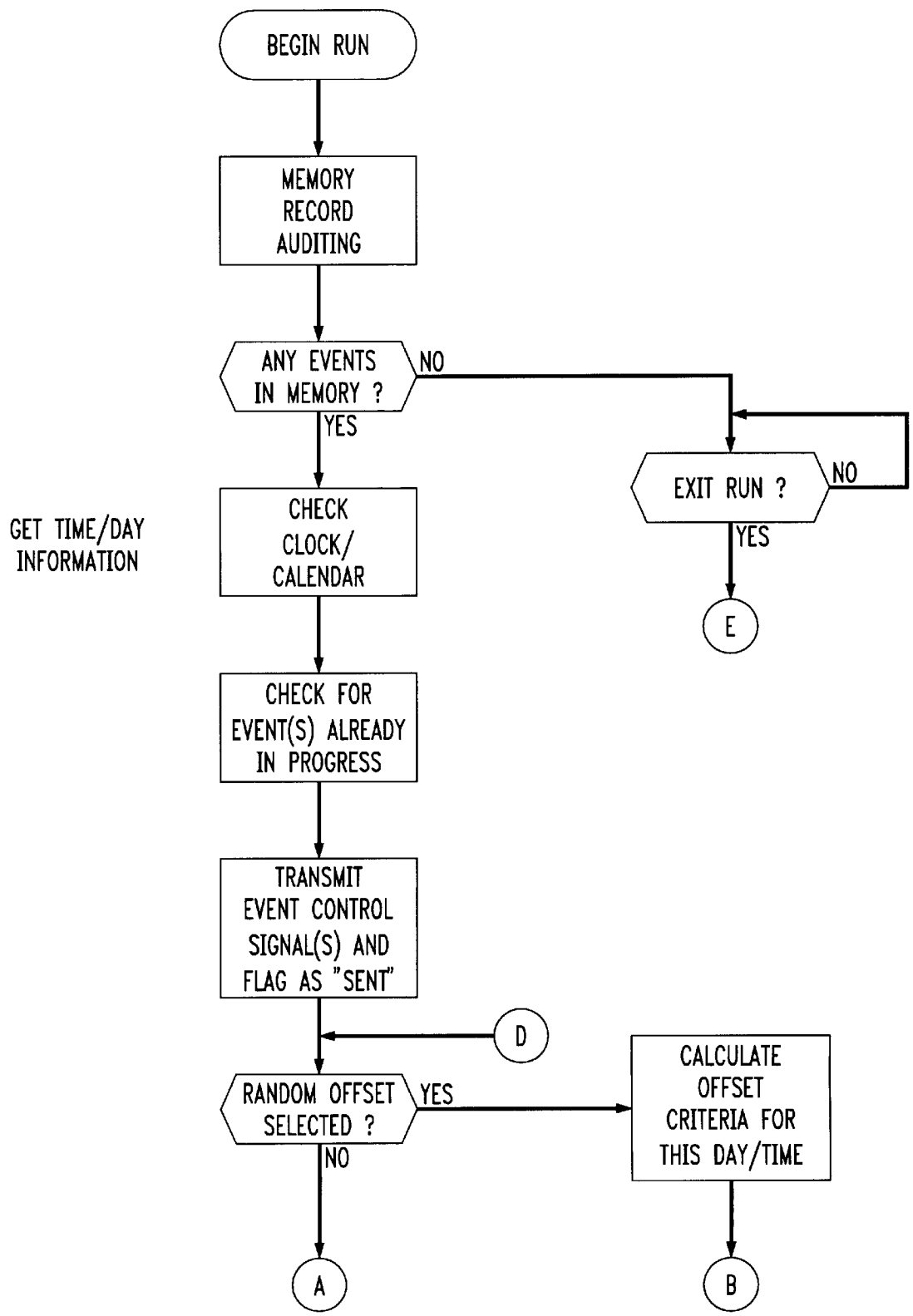
FIGS. 8A–8D show flow charts of the run mode of the intelligent control system of FIG. 6.
Figure 8B:
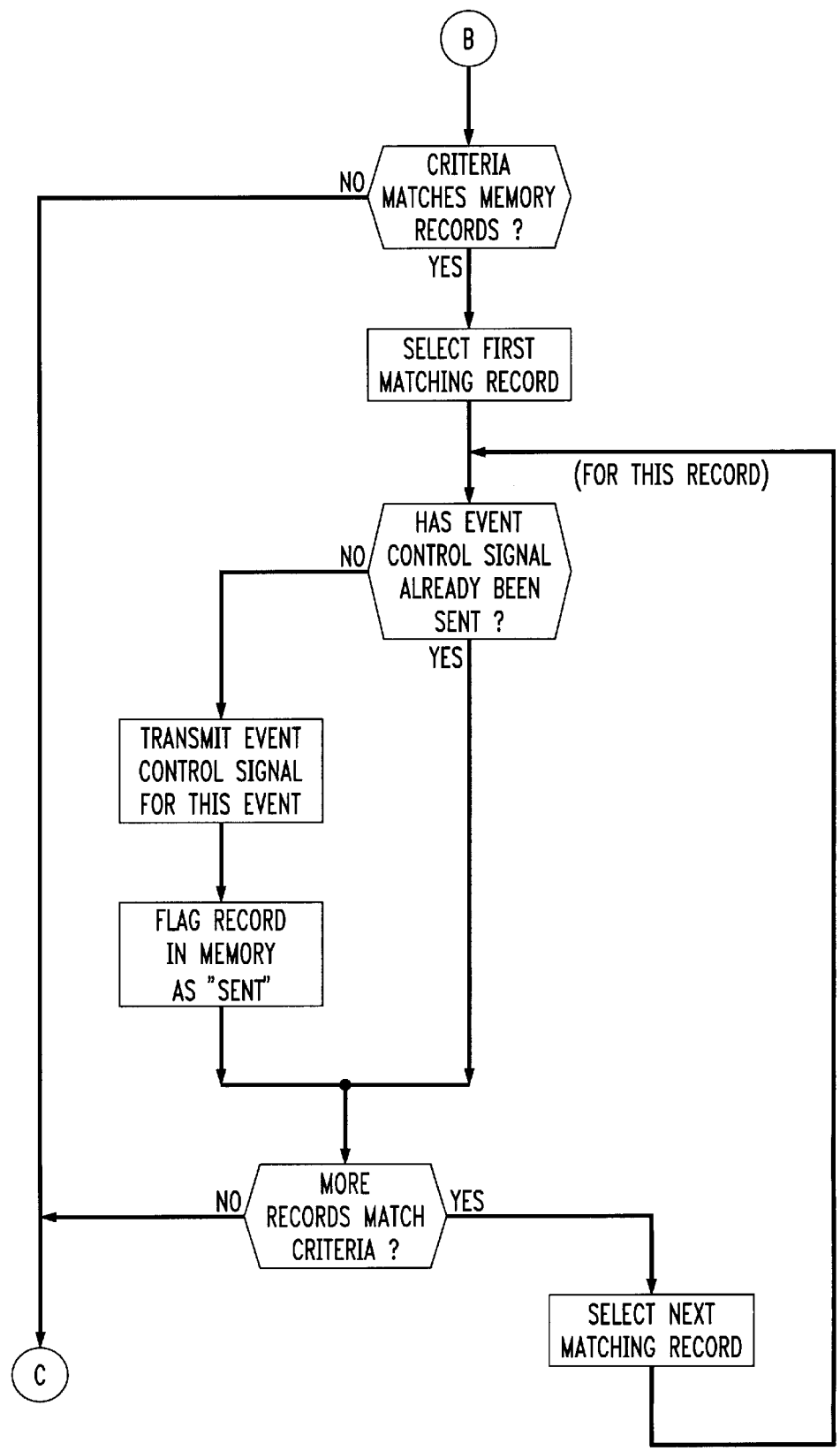
Figure 8C:
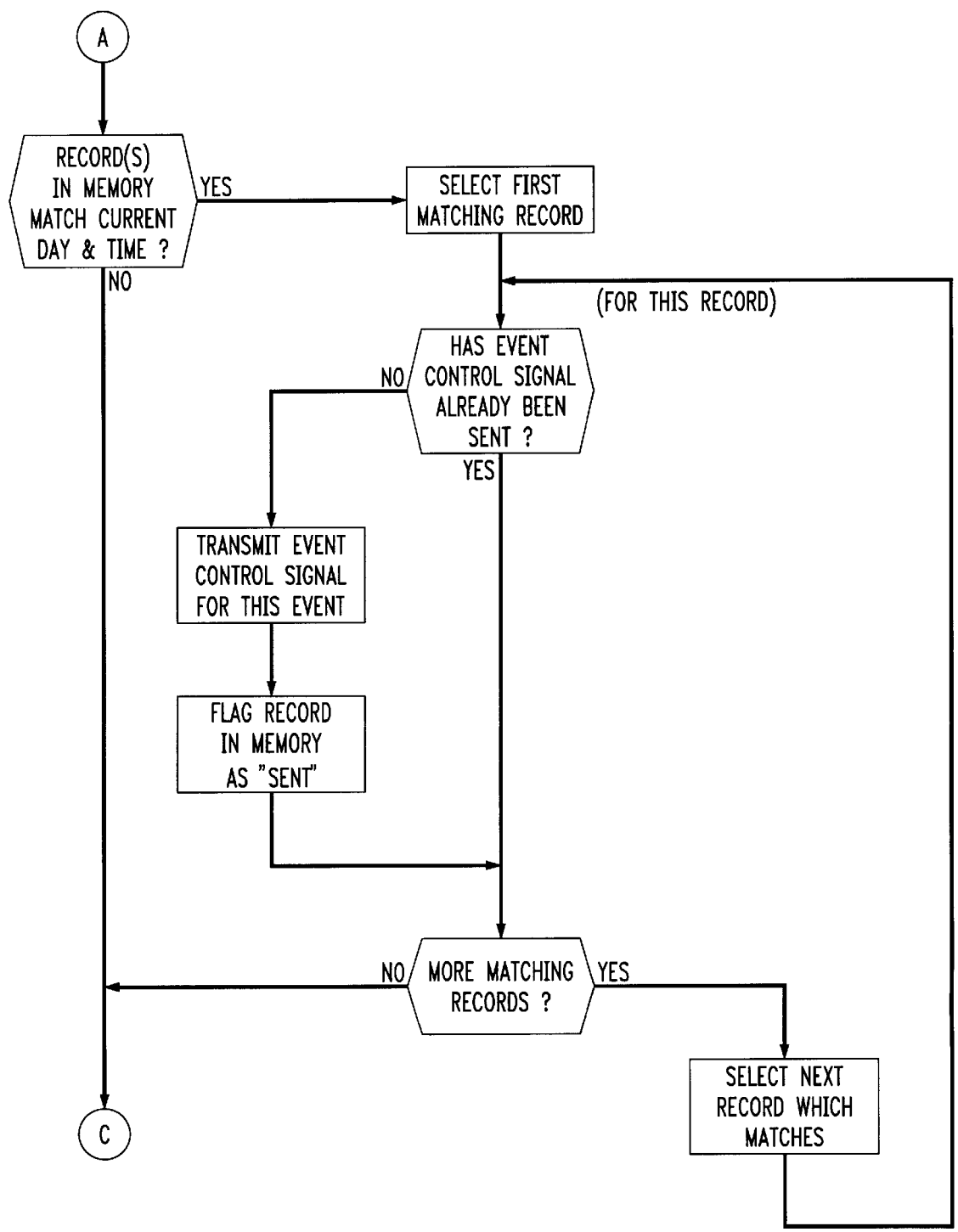
Figure 8D:
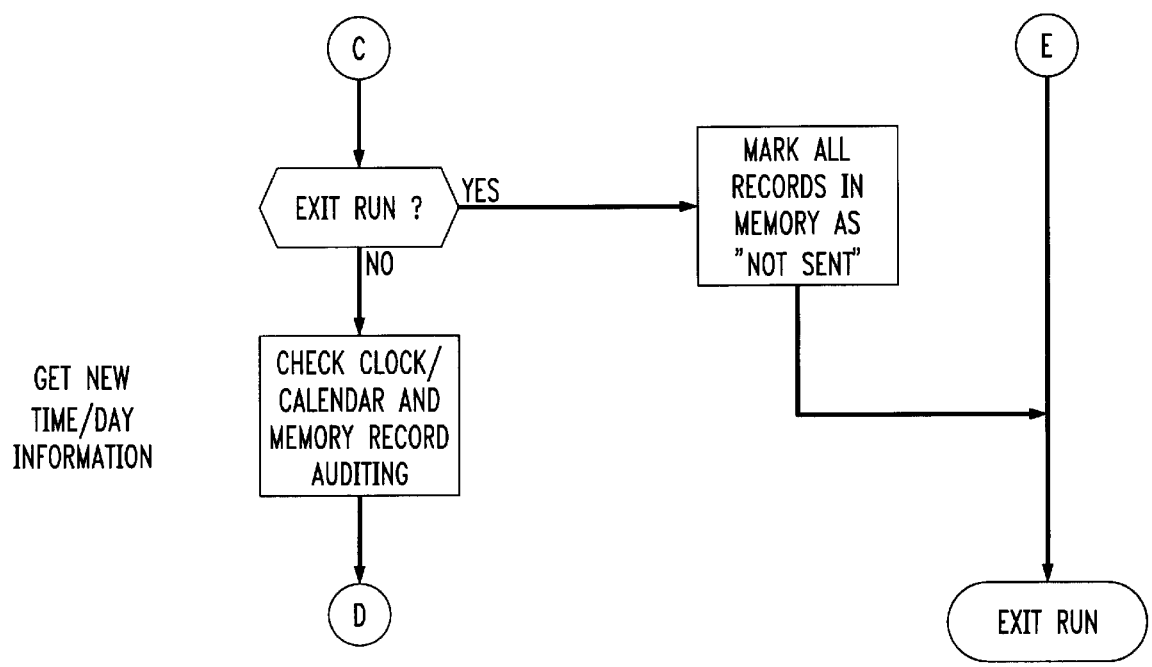

FIGS. 8A–8C show flow charts of the run mode of the intelligent control system 47 of FIG. 6. The run mode begins with an audit of record(s) in memory 36. If no records exist in memory 36 the control unit 33 waits for the user to exit the run mode via a request at the user interface 38. During this time, the control unit 33 may indicate to the user that there are no events stored in memory 36 via the user interface 38 or by other means. If events exist in memory 36 then the clock and calendar unit 40 is checked to get time and day information. A check is performed for event(s) already in progress. An on event is one for which the present day and time fall between the day and time of an on event and an off event record stored in memory 36. The event control signal(s) are transmitted via the controlled device interface 48 to all controlled devices 35 and the event record in memory 36 will be flagged as "sent." If a random offset is selected, the offset criteria for matching on and off events in memory 36 are calculated based on the present day and time. If the criterion matches the record(s) in memory 36, the first matching record is selected. A check is made to determine if the event control signal for this record has already been sent. If yes, a check for more records that match the criteria is performed. If no, the corresponding event control command is transmitted via the controlled device interface 48 to all controlled devices 35 and the event record in memory 36 will be flagged as "sent" and a check for more records that match the criteria is performed. The process of identifying matching records and sending control commands for events for which commands have not yet been sent continues until no more matching records remain. Then, the control unit 33 resumes checking the clock and calendar unit 40 for current day and time information and seeking records which match the current time and day. If no, the run mode may be exited after checking the clock and calendar unit 40 for time and day information and the memory 36 auditing functions are performed.

If a random offset is not selected, a determination is made whether record(s) in memory 36 match the current time and day. If yes, the first matching record is selected. Again a check is made to see if the control signal has been sent for this record. If yes, a check for more matching records is performed and if found, the process continues. If the control signal has not been sent for this record, the event control signal is transmitted via the controlled device interface 48 to all controlled devices 35 and the event record in memory 36 will be flagged as "sent." Again, a check for additional matching records is performed. If found, the process continues. If not, the exit run mode may be exited after checking the clock and calendar unit 40 for time and day information and the memory 36 auditing functions are performed.

By monitoring and recording appliance use over time, and then using this same information to control the automatic activation and de-activation of the same appliances, a building or dwelling can be made to be appear to be occupied. The system and method described herein would make the operation of controlled devices appear to be random, much like actual use by the building's occupant or owner. Unlike prior art timers and preprogrammed control systems, the system and method taught herein more faithfully recreates the appearance of occupancy. Buildings that appear to be occupied are less likely to be vandalized or burglarized.

What is claimed is:

1. A method for providing activation and deactivation control of appliance devices in an unoccupied building such that said appliance device activation and deactivation simulates occupancy of the building comprising the steps of:
   a) detecting appliance device use and recording when use occurs;
   b) recording said use of said appliance devices in a data record in a memory device;
   c) reading records of said use of said appliance devices from said memory device;
   d) using said records of appliance device use to actuate said devices according to said data records;
   (e) retrieving from said memory device records of appliance device use; and
   (f) controlling activation and deactivation of said appliance device use according to said device records so as to recreate the appearance of building occupancy by a building resident.

2. The method of claim 1 where said detecting appliance device use and said recording said use of said appliances is performed in a system learn mode.

3. The method of claim 1 where said reading said records of said use and said using said records of appliance device use is performed in a system run mode.

4. The method of claim 1 wherein said recording said use of said appliance devices occurs is comprised of manually turning said appliance devices on and off.

5. The method of claim 1 wherein said recording step further comprises:
   capturing said usage in an intelligent control system by time of day.

6. The method of claim 1 wherein said recording step further comprises:
   capturing said usage in an intelligent control system by day of week.

7. The method of claim 1 wherein said recording step further comprises:
   capturing an usage in said intelligent control system by day of week and time of day.

8. The method of claim 1 further wherein said steps of:
   a) recording said use of said appliance devices in a data record in a memory device;
   b) reading records of said use of said appliance devices from said memory device; and
   c) using said records of appliance device use to actuate said devices according to said data records;
are performed remotely.

9. A method for capturing the on and off usage of a device that is in a building and controlling the operation of said device based on said on and off usage comprising the steps of:
   a) recording all on and off usage of said device plugged into an intelligent control unit;
   b) retrieving said on and off usage from a record of said intelligent control unit; and
   c) re-creating said on and off usage of said device by switching on and off said device based on said pre-recorded usage stored in said record so as to recreate an appearance of occupancy of the building by an occupant.

10. A system for recording and controlling the on and off usage of a device that is in a building, the system comprising:
    a) a power source;
    b) an intelligent control system interposed between said device and said power source for recording said on and off usage of said device in memory of said intelligent control system;
    c) a current sensor means for sensing when said device has been turned on and off;
    d) a clock and calendar unit for establishing and stamping a time of said on and off usage of said device; and
    e) a controlled device interface operatively connected to said intelligent control system for controlling more than one said intelligent control system, and for recreating said on and off usage of said device by switching on and off said device based on said pre-recorded usage stored in said record so as to recreate an appearance of occupancy of the building by an occupant.

11. The system of claim 10 further comprises:
    a user interface operatively connected to said intelligent control system for manually controlling said intelligent control system and for displaying status of said devices connected to said intelligent control system.

12. A method for simulating the on and off events for each device that is in binding and that is connected to a controller, the method comprising the steps of:
    recording by said controllers a record each time said on and off events occur for each said device on a system;
    inserting a time stamp on said record for each said on and off events;
    saving said records in memory of said controller for an entire day of said on and off events memory of said controller and inserting a day of week indication in said records;
    retrieving at random one of said memory of said controller for subject day of week; and
    recreating said on and off events for said devices using said record at specified times so as to recreate an appearance of occupancy of the building by an occupant.

13. The method of claim 12 further comprises:
    storing multiple said records for each day.

14. The method of claim 12 wherein said recreating step further comprises:
    inserting a random time offset to said record.

15. The method of claim 12 further comprises:
    programming said devices to be saved in said record.

16. The method of claim 12 further comprises:
    programming a time of day of said on and off events of said devices to be saved in said record.

17. The method of claim 12 further comprises:
programming said day of week of said on and off events of said devices to be saved in said record.

18. The method of claim 12 further comprises:
programming said devices to be saved in said record, a time of day of said on and off events of said devices to be saved in said record and said day of week of said on and off events of said devices to be saved in said record.

19. An apparatus for simulating on and off events that occur when devices are used by occupants of a dwelling and connected to a controller comprising:
 recording means for recording by said controllers a record each time said on and off events occur for each said device on a system;
 insertion means for inserting a time stamp on said record for each said on and off events;
 saving means for saving said records in memory of said controller for an entire day of said on and off events in memory of said controller and inserting a day of week indication in said records;
 retrieval means for retrieving at random one of said records from said memory of said controller for subject day of week; and
 recreating means for recreating said on and off events for said devices using said record at specified times so as to recreate an appearance of occupancy of the dwelling by an occupant.

20. The apparatus of claim 19 further comprises:
storing means for storing multiple said records for each day.

21. The apparatus of claim 19 wherein said recreating step further comprises:
insertion means for inserting a random time offset to said record.

22. The apparatus of claim 19 further comprises:
programming means for programming said devices to be saved in said record.

23. The apparatus of claim 19 further comprises:
programming means for programming a time of day of said on and off events of said devices to be saved in said record.

24. The apparatus of claim 19 further comprises:
programming means for programming said day of week of said on and off events of said devices to be saved in said record.

25. The apparatus of claim 19 further comprises:
programming means for programming said devices to be saved in said record, a time of day of said on and off events of said devices to be saved in said record and said day of week of said on and off events of said devices to be saved in said record.

* * * * *